United States Patent
Christensen et al.

(10) Patent No.: US 8,859,123 B2
(45) Date of Patent: *Oct. 14, 2014

(54) SYSTEM AND METHOD FOR PRESSURE DETERMINATION IN A LI-ION BATTERY

(75) Inventors: John F. Christensen, Mountain View, CA (US); Boris Kozinsky, Newton, MA (US); Jasim Ahmed, Mountain View, CA (US); Nalin Chaturvedi, Sunnyvale, CA (US)

(73) Assignee: Robert Bosch GmbH, Stuttgart (DE)

(*) Notice: Subject to any disclaimer, the term of this patent is extended or adjusted under 35 U.S.C. 154(b) by 641 days.

This patent is subject to a terminal disclaimer.

(21) Appl. No.: 12/437,643

(22) Filed: May 8, 2009

(65) Prior Publication Data

US 2010/0285338 A1    Nov. 11, 2010

(51) Int. Cl.
*H01M 10/48* (2006.01)
*H01M 4/136* (2010.01)
*H01M 10/058* (2010.01)
*H01M 4/134* (2010.01)
*H01M 10/44* (2006.01)
*H01M 10/052* (2010.01)
*H01M 10/42* (2006.01)
*H01M 10/0525* (2010.01)

(52) U.S. Cl.
CPC ............ *H01M 10/445* (2013.01); *H01M 4/136* (2013.01); *H01M 10/486* (2013.01); *H01M 10/058* (2013.01); *H01M 4/134* (2013.01); *Y02E 60/122* (2013.01); *H01M 10/052* (2013.01); *H01M 10/425* (2013.01); *H01M 10/443* (2013.01); *H01M 10/48* (2013.01); *H01M 10/0525* (2013.01)
USPC .............................................. 429/91; 429/90

(58) Field of Classification Search
CPC .......... H01M 10/052; H01M 10/0525; H01M 10/058; H01M 10/425; H01M 10/443; H01M 10/445; H01M 10/48; H01M 10/486; H01M 4/134; H01M 4/136; Y02E 60/122
USPC ....................................................... 429/90–93
See application file for complete search history.

(56) References Cited

U.S. PATENT DOCUMENTS 2,812,376 A * 11/1957 Yardney .......................... 429/66
3,925,098 A * 12/1975 Saunders et al. .............. 429/103

(Continued)

FOREIGN PATENT DOCUMENTS

DE    3030779    3/1982

OTHER PUBLICATIONS

Christensen, J. and J. Newman, Effect of anode film resistance on the charge/discharge capacity of a lithium-ion battery. Journal of the Electrochemical Society, 2003. 150(11): p. A1416-A1420.
Amatucci, G.G. and N. Pereira, Fluoride based electrode materials for advanced energy storage devices. Journal of Fluorine Chemistry, 2007. 128(4):p. 243-262.

(Continued)

*Primary Examiner* — Raymond Alejandro
*Assistant Examiner* — Helen McDermott
(74) *Attorney, Agent, or Firm* — Maginot, Moore & Beck

(57) ABSTRACT

An electrochemical battery system in one embodiment includes a first electrode, a second electrode spaced apart from the first electrode, a separator positioned between the first electrode and the second electrode, an active material within the second electrode, a pressure sensor in fluid connection with the second electrode, a memory in which command instructions are stored, and a processor configured to execute the command instructions to obtain a pressure signal from the pressure sensor associated with the pressure within the second electrode, and to identify a state of charge of the electrochemical battery system based upon the pressure signal.

6 Claims, 3 Drawing Sheets

(56) References Cited

U.S. PATENT DOCUMENTS

| | | | |
|---|---|---|---|
| 4,469,761 A | | 9/1984 | Bennett et al. |
| 5,567,541 A | * | 10/1996 | Rouhani ................... 429/93 |
| 5,580,675 A | | 12/1996 | Rouhani |
| 5,686,815 A | * | 11/1997 | Reipur et al. ............. 320/116 |
| 5,814,420 A | | 9/1998 | Chu |
| 6,046,575 A | | 4/2000 | Demuro |
| 6,773,616 B1 | | 8/2004 | Chen et al. |
| 7,029,796 B2 | | 4/2006 | Choi et al. |
| 2004/0214091 A1 | | 10/2004 | Lim et al. |
| 2004/0242804 A1 | | 12/2004 | Medsker et al. |
| 2005/0158614 A1 | * | 7/2005 | Hennessy .................. 429/61 |
| 2006/0154141 A1 | | 7/2006 | Salot et al. |
| 2006/0216603 A1 | | 9/2006 | Choi |
| 2007/0042267 A1 | | 2/2007 | Kim et al. |
| 2007/0202400 A1 | | 8/2007 | Yoshida et al. |
| 2007/0259255 A1 | | 11/2007 | Leysieffer et al. |
| 2008/0044732 A1 | | 2/2008 | Salot et al. |
| 2008/0058194 A1 | | 3/2008 | Grader et al. |

OTHER PUBLICATIONS

Mikhaylik, Y. Fundamental Chemistry of Sion Power Li/S Battery, in International Battery Association and Hawaii Battery Conference. 2006. Waikoloa, HI.

Wang, J., L. Liu, Z. Ling, J. Yang, C. Wan, and C. Jiang, Polymer lithium cells with sulfur composites as cathode materials. Electrochimica Acta, 2003. 48(13): p. 1861-1867.

Shim, J., K.A. Striebel, and E.J. Cairns, the Lithium/Sulfur Rechargeable Cell. Journal of the Electrochemical Society, 2002. 149: p. A1321.

Doughty, D.H., D.L. Coleman, and M.J. Berry. Abuse Tolerance Studies on Lithium-Sulfur (Li-S) Rechargeable Batteries. In 43rd Power Sources Conference. 2008. Philadelphia, PA.

International Search Report in corresponding PCT application (i.e., PCT/US2010/033983), mailed Jul. 19, 2010 (4 pages).

Christensen, J. and J. Newman, "Cyclable Lithium and Capacity Loss in Li-Ion Cells." Journal of the Electrochemical Society, 2005. 152(4): p. A818-A829.

* cited by examiner

SYSTEM AND METHOD FOR PRESSURE DETERMINATION IN A LI-ION BATTERY

Cross-reference is made to U.S. Utility patent application Ser. No. 12/437,576 entitled "Li-ion Battery with Selective Moderating Material" by John F. Christensen et al., which was filed on May 8, 2009; U.S. Utility patent application Ser. No. 12/437,592 entitled "Li-ion Battery with Blended Electrode" by John F. Christensen et al., which was filed on May 8, 2009; U.S. Utility patent application Ser. No. 12/437,606 entitled "Li-ion Battery with Variable Volume Reservoir" by John F. Christensen et al., which was filed on May 8, 2009; U.S. Utility patent application Ser. No. 12/437,622 entitled "Li-ion Battery with Over-charge/Over-discharge Failsafe" by John F. Christensen et al., which was filed on May 8, 2009; U.S. Utility patent application Ser. No. 12/437,745 entitled "Li-ion Battery with Load Leveler" by John F. Christensen et al., which was filed on May 8, 2009; U.S. Utility patent application Ser. No. 12/437,774 entitled "Li-ion Battery with Anode Coating" by John F. Christensen et al., which was filed on May 8, 2009; U.S. Utility patent application Ser. No. 12/437,791 entitled "Li-ion Battery with Anode Expansion Area" by Boris Kozinsky et al., which was filed on May 8, 2009; U.S. Utility patent application Ser. No. 12/437,822 entitled "Li-ion Battery with Porous Silicon Anode" by Boris Kozinsky et al., which was filed on May 8, 2009; U.S. Utility patent application Ser. No. 12/437,873 entitled "Li-ion Battery with Rigid Anode Framework" by Boris Kozinsky et al., which was filed on May 8, 2009; U.S. Utility patent application Ser. No. 12/463,024 entitled "System and Method for Charging and Discharging a Li-ion Battery" by Nalin Chaturvedi et al., which was filed on May 8, 2009; and U.S. Utility patent application Ser. No. 12/463,092 entitled "System and Method for Charging and Discharging a Li-ion Battery Pack" by Nalin Chaturvedi et al., which was filed on May 8, 2009, the entirety of each of which is incorporated herein by reference. The principles of the present invention may be combined with features disclosed in those patent applications.

FIELD OF THE INVENTION

This invention relates to batteries and more particularly to lithium-ion batteries.

BACKGROUND

Batteries are a useful source of stored energy that can be incorporated into a number of systems. Rechargeable lithium-ion batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (in Wh/kg) and energy density (in Wh/L) compared to batteries with conventional carbonaceous negative electrodes.

When high-specific-capacity negative electrodes such as lithium are used in a battery, the maximum benefit of the capacity increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, *Fluoride based electrode materials for advanced energy storage devices*. Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Lithium/sulfur (Li/S) batteries are particularly attractive because of the balance between high specific energy (i.e., >350 Wh/kg has been demonstrated), rate capability, and cycle life (>50 cycles). Only lithium/air batteries have a higher theoretical specific energy. Lithium/air batteries, however, have very limited rechargeability and are still considered primary batteries.

A drawback that is common to many lithium ion batteries results from the fact that the chemistries incorporate phase-change materials that exhibit voltage plateaus dependent upon the particular cell chemistry, resulting in a very flat open-circuit potential (OCP) over the normal operating voltage of the cell. Battery state of charge (SOC), however, is typically estimated using a combination of two techniques: coulomb counting and OCP measurement.

Coulomb counting involves integrating the current that is passed to or from the cell to calculate the change in the cell's capacity. Errors in current measurement render this technique inaccurate over time, while side reactions in the cell lead to further deviations between the estimated and actual SOC. By measuring or estimating the OCP, or rest potential, of the cell, one may use OCP-SOC functional relationships to extract the SOC. The coulomb-counting technique tends to be more accurate at short times or when the current is high, while the OCP technique does better when the cell is at rest or the current is low. The two techniques of SOC estimation are typically combined in a number of different ways to obtain the most accurate estimate of SOC possible at all times.

Thus, flat or shallowly sloping OCPs, while providing some advantages, make accurate SOC estimation very difficult. Accordingly, for cells with a flat (or shallowly sloping) OCP, the OCP-SOC correlation technique does not provide the desired accuracy in determination of the cell SOC. Since coulomb counting alone is inherently inaccurate, a need exists for alternative SOC estimation techniques for lithium ion batteries.

What is needed therefore is a battery system and method that provides the advantages of chemistries which exhibit a flat or shallowly sloping OCP while providing a more accurate SOC determination. A system which could also be used to provide an indication of overpressure conditions in a cell would be beneficial.

SUMMARY

An electrochemical battery system in one embodiment includes a first electrode, a second electrode spaced apart from the first electrode, a separator positioned between the first electrode and the second electrode, an active material within the second electrode, a pressure sensor in fluid connection with the second electrode, a memory in which command instructions are stored, and a processor configured to execute the command instructions to obtain a pressure signal from the pressure sensor associated with the pressure within the second electrode, and to identify a state of charge of the electrochemical battery system based upon the pressure signal.

In accordance with another embodiment, a method of determining the state of charge of an electrochemical cell includes storing data indicative of the relationship between a range of pressures in an electrochemical cell and a range of states of charge for the electrochemical cell in a memory, generating a signal associated with the pressure within the electrochemical cell, receiving the signal associated with the pressure within the electrochemical cell; and identifying a state of charge of the electrochemical cell based upon the received signal and the stored data.

DESCRIPTION

Figure 1:
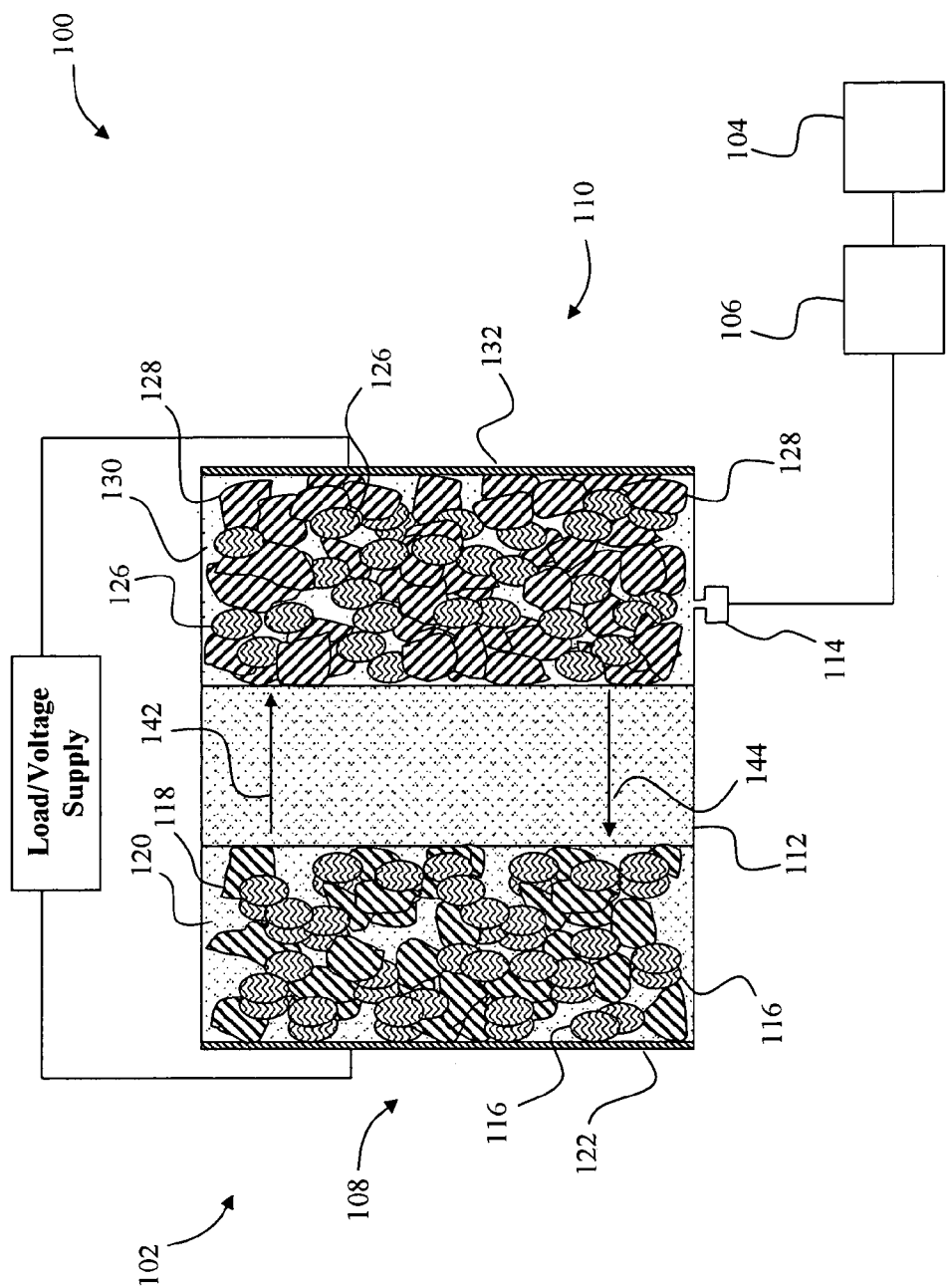
FIG. 1 depicts a schematic of a battery system including an electrochemical cell with one electrode including a material that exhibits significant volume changes as the electrochemical cell cycles, along with a pressure sensor in fluid communication with the electrode.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

FIG. 1 depicts a lithium-ion battery system 100 including a lithium ion cell 102, a memory 104, and a processor 106. Various command instructions, discussed in further detail below, are programmed into the memory 104. The processor 106 is operable to execute the command instructions programmed into the memory 104.

The lithium ion cell 102 includes a negative electrode 108, a positive electrode 110, and a separator region 112 between the negative electrode 108 and the positive electrode 110. A pressure sensor 114 is in fluid communication with the positive electrode 110. The negative electrode 108 includes active materials 116 into which lithium can be inserted, inert materials 118, electrolyte 120 and a current collector 122.

The negative electrode 108 may be provided in various alternative forms. The negative electrode 108 may incorporate dense Li metal or a conventional porous composite electrode (e.g., graphite particles mixed with binder). Incorporation of Li metal is desired since the Li metal affords a higher specific energy than graphite.

The separator region 114 includes an electrolyte with a lithium cation and serves as a physical and electrical barrier between the negative electrode 108 and the positive electrode 110 so that the electrodes are not electronically connected within the cell 102 while allowing transfer of lithium ions between the negative electrode 108 and the positive electrode 110.

The positive electrode 110 includes active material 126 into which lithium can be inserted, a conducting material 128, fluid 130, and a current collector 132. The active material 126 includes a form of sulfur and may be entirely sulfur. The conducting material 128 conducts both electrons and lithium ions and is well connected to the separator 112, the active material 126, and the collector 132. In alternative embodiments, separate material may be provided to provide the electrical and lithium ion conduction. The fluid 130, which may be a liquid or a gas, is relatively inert with respect to the other components of the positive electrode 110. Gas which may be used includes argon or nitrogen. The fluid 130 fills the interstitial spaces between the active material 126 and the conducting material 128. The fluid 130 is in fluid communication with the pressure sensor 114.

The lithium-ion cell 102 operates in a manner similar to the lithium-ion battery cell disclosed in U.S. patent application Ser. No. 11/477,404, filed on Jun. 28, 2006, the contents of which are herein incorporated in their entirety by reference. In general, electrons are generated at the negative electrode 108 during discharging and an equal amount of electrons are consumed at the positive electrode 110 as lithium and electrons move in the direction of the arrow 142 of FIG. 1.

In the ideal discharging of the cell 102, the electrons are generated at the negative electrode 108 because there is extraction via oxidation of lithium ions from the active material 116 of the negative electrode 108, and the electrons are consumed at the positive electrode 110 because there is reduction of lithium ions into the active material 126 of the positive electrode 110. During discharging, the reactions are reversed, with lithium and electrons moving in the direction of the arrow 144.

Figure 2:
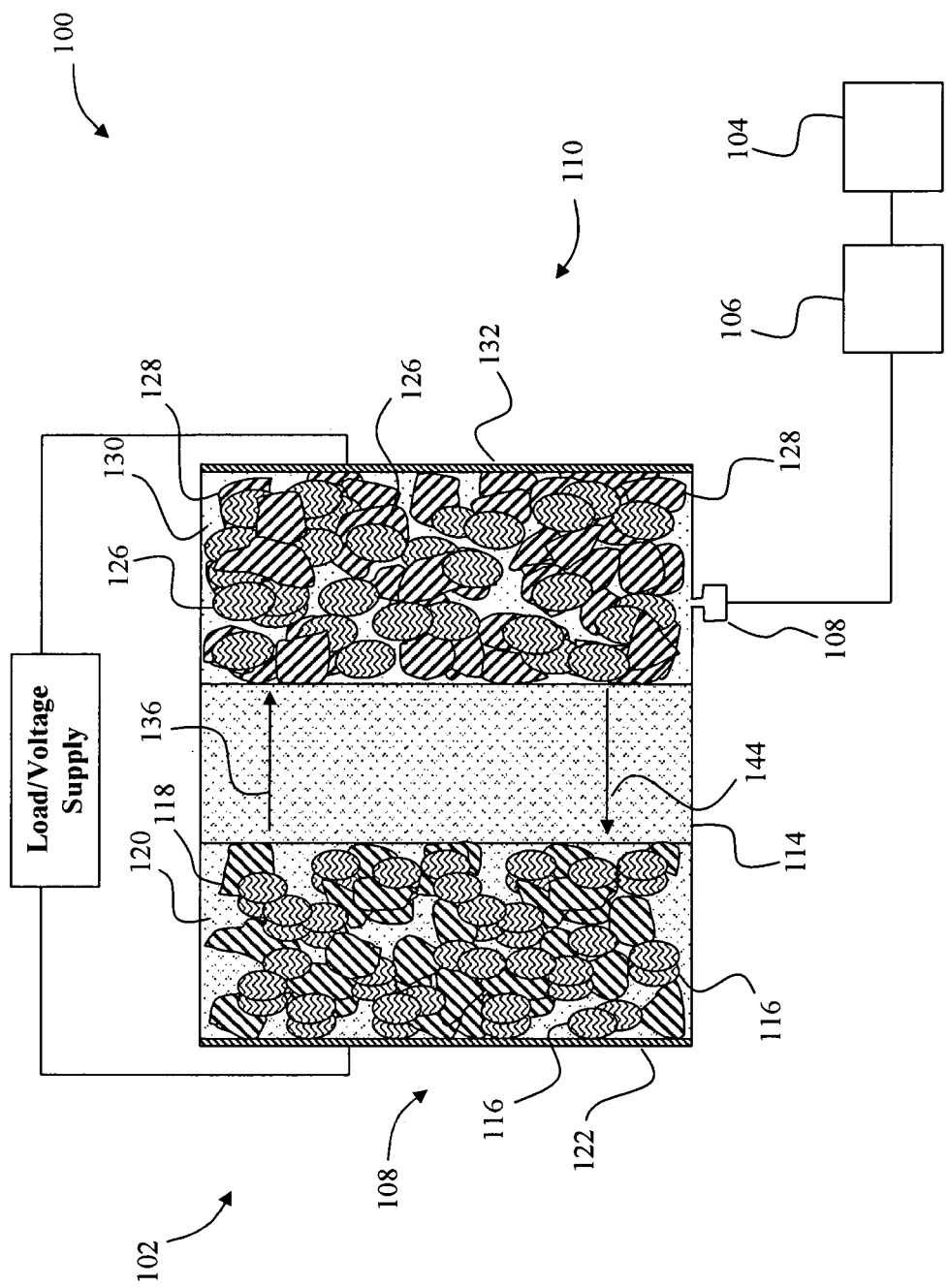
FIG. 2 depicts a schematic of the battery system of FIG. 1 after a significant increase in the volume of the material that exhibits significant volume changes has occurred resulting in an increase in pressure within the electrode.

As lithium is reduced into the active material 126, the volume of the active material 126 increases. This is depicted in FIG. 2 by the increased size of the individual particles of active material 126 compared to the size of the individual particles of active material 126 in the FIG. 1. In the case of a Li/S battery, for example, the sulfur active material increases in volume by 80% as it becomes lithiated during battery discharge.

As the volume of the active material 126 increases, the pressure within the positive electrode 110 increases. The pressure within the electrode 110 is thus inversely related to the SOC of the electrochemical cell 102. The pressure in the electrode 110 is sensed by the pressure sensor 114 and a signal indicative of the pressure is passed to the processor 106. The pressure signal may be used to monitor the cell 102 for overpressure conditions which may occur if the cell is overcharged or over-discharged. The pressure signal may further be used to obtain an indication of the SOC of the cell 102.

Figure 3:
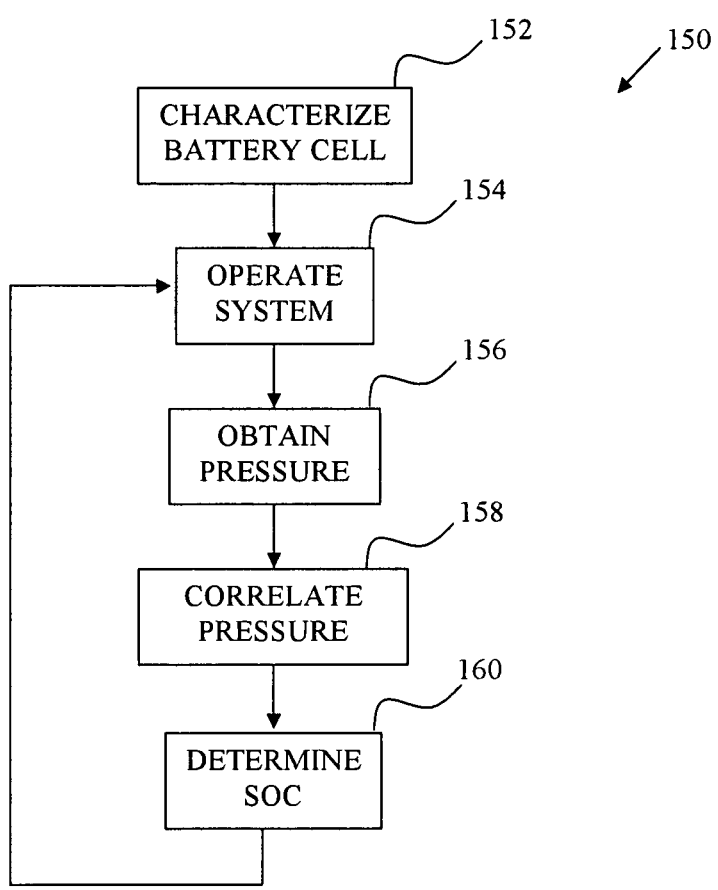
FIG. 3 depicts a flow diagram of a procedure that may be performed by the battery system of FIG. 1 to determine the state of charge of the system based upon the pressure sensed within the electrode.

In one embodiment, the processor 106 executes command instructions stored within the memory 106 in accordance with a procedure 150 of FIG. 3 to identify the SOC of the cell 102. At block 152, the battery cell 102 is characterized. Characterization of the battery cell 102 identifies the relationship between the pressure in the electrode 110 and the state of charge of the cell 102. At block 154, the battery system 100 is used to supply power to a load, and recharged according to system procedures. If desired, a coulomb counter may be used to monitor the current flow into and out of the electrode 110 from the load/voltage supply. The coulomb counter may be an ammeter with an integration circuit and/or processor for integrating the current flow. The SOC of the battery system 100 may be estimated during operations based upon the coulomb counter.

At block 156, the processor 106 obtains a signal from the pressure sensor 114 indicative of the pressure within the same electrode 110. The processor then correlates the obtained signal with the characterization data stored in the memory 104 at block 158 and determines the associated state of charge at block 160.

The procedure 150 may be modified for various applications. By way of example, throughout the procedure 150, the electrochemical cell 102 may continue to be used to provide a current or to be charged. If the cell 102 is being charged or discharged, the temperature 102 of the cell may be different from the temperature of the cell 102 at the time that the characterization data for the cell 102 was obtained at block 152. Temperature variations may affect the pressure within the electrode 110. Accordingly, a thermometer thermally connected to the electrode 102 or the fluid 130 may be provided. In such embodiments, the effect of temperature on the pressure within the electrode 110 may be characterized and the characterization data stored within the memory 104. Accordingly, the identification of the cell state of charge may be corrected for the temperature of the electrode 110 at the time that the pressure signal was obtained from the pressure sensor 114.

The procedure 150 may be performed for each electrochemical cell within a battery system to identify the SOC of the system without any interruption of battery system operation. Characterization of the relationship between the sensed pressure and actual SOC of the electrochemical cells may be updated periodically. By way of example, the pressure may be monitored during a procedure that identifies the capacity of the cell or during cell balancing, complete charge, or complete discharge of all individual cells.

In addition to battery systems such as the battery system 100 of FIG. 1 wherein the pressure within the electrode 110 is substantially isolated from the pressure within the electrode 108, the procedure 150 may be used in a system wherein the electrodes are subjected to a common pressure. In such systems, accuracy of the SOC determination is optimized as the difference in volume change of the active materials is maximized.

In further embodiments, the pressure in the negative electrode may be used to identify the SOC of the electrochemical cell. By way of example, LiSi, typically used as an anode material, exhibits a large increase in volume during operation. In systems wherein the pressure within the electrodes is isolated from the pressure of other electrodes, multiple pressure sensors may be provided, each pressure sensor used in a different electrode.

In some embodiments, the pressure variation of an electrode may be reduced by provision of an expandable membrane such as in a variable volume reservoir. In such embodiments, strain sensors may be used in conjunction with the membrane to monitor volume changes of the variable volume reservoir, which is directly related to pressure changes in the electrode.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A lithium-ion electrochemical battery system, comprising:
    a first electrode;
    a second electrode spaced apart from the first electrode;
    a separator positioned between the first electrode and the second electrode;
    an active material within the second electrode, wherein a volume of the active material increases as a state of charge of the battery system decreases, and the battery system is configured such that an increase in the volume of the active material causes an increase in a pressure within the second electrode;
    a pressure sensor in fluid connection with the second electrode;
    a memory in which command instructions are stored; and
    a processor which is operated to execute the command instructions programmed into the memory to obtain a pressure signal from the pressure sensor indicative of the pressure within the second electrode which is substantially isolated from a pressure within the first electrode, and to identify the state of charge of the battery system by correlating the pressure signal with stored date indicative of a relationship between a range of pressures within the second electrode and a range of states of charge of the battery system.

2. The lithium-ion electrochemical battery system of claim 1, wherein the second electrode is a cathode.

3. The lithium-ion electrochemical battery system of claim 2, wherein the active material comprises a form of sulfur.

4. The lithium-ion electrochemical battery system of claim 1, wherein the first electrode is a cathode.

5. The lithium-ion electrochemical battery system of claim 4, wherein the active material comprises a form of LiSi.

6. The lithium-ion electrochemical battery system of claim 1, further comprising:
    a temperature sensor in thermal contact with the second electrode, wherein the processor is further configured to execute the command instructions to obtain a temperature signal from the temperature sensor associated with the temperature within the second electrode, and to identify the state of charge of the electrochemical battery system based upon the temperature signal.

* * * * *